(12) United States Patent
Bui et al.

(10) Patent No.: US 8,134,797 B2
(45) Date of Patent: Mar. 13, 2012

(54) APPLICATION OF CONTINUOUS POSITION ERROR OFFSET SIGNAL TO ACQUIRE SERVO TRACK

(75) Inventors: Nhan Xuan Bui, Tucson, AZ (US); Randy Clark Inch, Tucson, AZ (US); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 12/716,956

(22) Filed: Mar. 3, 2010

(65) Prior Publication Data

US 2011/0216441 A1    Sep. 8, 2011

(51) Int. Cl.
  *G11B 5/55*    (2006.01)
  *G11B 5/584*    (2006.01)
(52) U.S. Cl. .................................. 360/78.02; 360/77.12
(58) Field of Classification Search .......................... None
See application file for complete search history.

(56) References Cited

U.S. PATENT DOCUMENTS

| | | | | |
|---|---|---|---|---|
| 5,177,652 | A * | 1/1993 | Yamaguchi et al. | 360/78.05 |
| 5,379,170 | A | 1/1995 | Schwarz | 360/109 |
| 5,623,461 | A * | 4/1997 | Sohmuta | 360/78.05 |
| 5,661,616 | A * | 8/1997 | Tran et al. | 360/78.02 |
| 5,901,008 | A | 5/1999 | Nayak et al. | 360/78.02 |
| 6,052,251 | A * | 4/2000 | Mohajerani et al. | 360/78.05 |
| 6,580,581 | B1 | 6/2003 | Bui et al. | 360/78.02 |
| 6,587,303 | B1 * | 7/2003 | Bui et al. | 360/78.12 |
| 6,833,974 | B2 * | 12/2004 | Koso et al. | 360/78.05 |
| 6,940,682 | B2 * | 9/2005 | Bui et al. | 360/77.12 |
| 6,963,467 | B2 * | 11/2005 | Bui et al. | 360/77.12 |
| 7,035,041 | B1 * | 4/2006 | Guo et al. | 360/78.05 |
| 7,126,785 | B1 * | 10/2006 | Li et al. | 360/78.05 |
| 7,280,307 | B2 * | 10/2007 | Bui et al. | 360/77.12 |
| 7,283,321 | B1 * | 10/2007 | Sun et al. | 360/78.05 |
| 7,466,510 | B2 * | 12/2008 | Johnson et al. | 360/77.12 |
| 7,889,454 | B2 * | 2/2011 | Johnson et al. | 360/77.12 |
| 8,004,789 | B2 * | 8/2011 | Bui et al. | 360/77.12 |
| 2001/0012172 | A1 * | 8/2001 | Hawwa et al. | 360/78.05 |
| 2011/0013312 | A1 * | 1/2011 | Bui et al. | 360/77.05 |
| 2011/0134556 | A1 | 6/2011 | Bui et al. | |

\* cited by examiner

*Primary Examiner* — Hoa T Nguyen
*Assistant Examiner* — James L Habermehl
(74) *Attorney, Agent, or Firm* — John H. Holcombe

(57) ABSTRACT

The method employs a servo system for positioning a head laterally to follow lateral motion of a longitudinal tape having longitudinal defined servo track(s), the servo system comprising a servo element configured to sense lateral position of the head with respect to an acquired servo track, a fine actuator configured to translate the head laterally with respect to the longitudinal tape, and a position error signal loop to operate the fine actuator to translate the head laterally to reduce position error. If the servo element is positioned away from the defined servo track(s), a continuous position error offset signal is applied to the fine actuator in a direction towards the defined servo track(s), whereby the fine actuator translates the head in accordance with the continuous position error offset signal; and, in response to the servo system acquiring the defined servo track(s), the continuous position error offset signal is discontinued.

16 Claims, 7 Drawing Sheets

APPLICATION OF CONTINUOUS POSITION ERROR OFFSET SIGNAL TO ACQUIRE SERVO TRACK

DOCUMENTS INCORPORATED BY REFERENCE

Commonly assigned U.S. patent application Ser. No. 12/612,403, Filed Nov. 4, 2009, is incorporated for its showing of a servo system for positioning a tape head laterally where the tape may shift in the lateral direction. Commonly assigned U.S. patent application Ser. No. 12/505,435, Filed Jul. 17, 2009, is incorporated for its showing of positioning a tape head using servo elements and data read elements.

FIELD OF THE INVENTION

This invention relates to servo systems for longitudinal tape moved in a longitudinal direction, and more particularly to acquiring the servo tracks defined on the longitudinal tape.

BACKGROUND OF THE INVENTION

A function of a servo system for longitudinal tape, such as magnetic tape, is to acquire a desired servo track and move a head laterally of the longitudinal tape to accurately follow the lateral movement of the tape, for example, during read/write operations of the head. If done accurately, data tracks are written and read in straight lines along the longitudinal tape as the tape is moved in the longitudinal direction. With respect to magnetic tape, the data comprises parallel tracks in the longitudinal direction of the magnetic tape. Servo tracks are prerecorded in the magnetic tape parallel to, and offset from, the expected data tracks.

Servo systems often employ compound actuators to move the head laterally both for track following, and to shift from one servo track (or set of servo tracks) to another and thereby follow a different set of data tracks. A compound actuator, which comprises a coarse actuator and a fine actuator mounted on the coarse actuator, provides both a large working dynamic range and high bandwidth. The high bandwidth fine actuator typically has a limited range of travel to attain the high bandwidth, and the coarse actuator has a greater range of travel.

Tape guides on either side of the head have in the past had flanges to constrain the lateral movement of the tape. The flanges of the tape guides, such as rollers, limit the lateral motion of the tape, but may tend to flex the edges of the tape and to introduce debris accumulation at the flanges that impact the lifetime of the tape and in addition create undesirable dynamic effects.

Flangeless tape guides tend to solve the problems of the flanged tape guides, but, without being constrained, the longitudinal tape tends to rapidly shift from one side of the tape guides to the other, and to run at one side of the guides for a period of time and then shift to the other side.

The fine actuator is designed to handle the rapid shifts of the longitudinal tape once the servo track has been acquired, and, as such, is capable of rapidly jumping in the direction needed follow the acquired servo track. With the shifting behavior of the tape, the servo system must first find and acquire the servo track in order to follow the servo track.

SUMMARY OF THE INVENTION

Methods, servo systems, servo controls, and data storage drives provide continuous movement of the head to acquire a servo track.

In one embodiment, the method employs a servo system for positioning a head laterally to follow lateral motion of a longitudinal tape having at least one longitudinal defined servo track, the servo system comprising a servo element configured to sense lateral position of the head with respect to defined servo tracks, a fine actuator configured to translate the head laterally with respect to the longitudinal tape, a coarse actuator configured to translate the fine actuator laterally with respect to the longitudinal tape, and a position error signal loop configured to sense the servo element, to determine position error between the head and a desired position related to an acquired defined servo track, and to operate the fine actuator to translate the head laterally in a manner to reduce the determined position error.

If the servo element is positioned away from the defined servo tracks, a continuous position error offset signal is applied to the fine actuator in a direction towards the defined servo track, whereby the fine actuator translates the head in accordance with the continuous position error offset signal; and, in response to the servo system acquiring the defined servo track, the continuous position error offset signal is discontinued.

In another embodiment, the applying step comprises integrating the continuous position error offset signal to operate the fine actuator to continuously translate the head laterally towards the defined servo track.

In still another embodiment, the continuous position error offset signal is a predetermined signal of a rate less than the maximum position error signal for the fine actuator.

In a further embodiment, the predetermined continuous position error offset signal is less than 5 percent of the maximum position error signal for the fine actuator.

In another embodiment, the direction of the applying step is determined in response to detection of the defined servo track with a data element.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
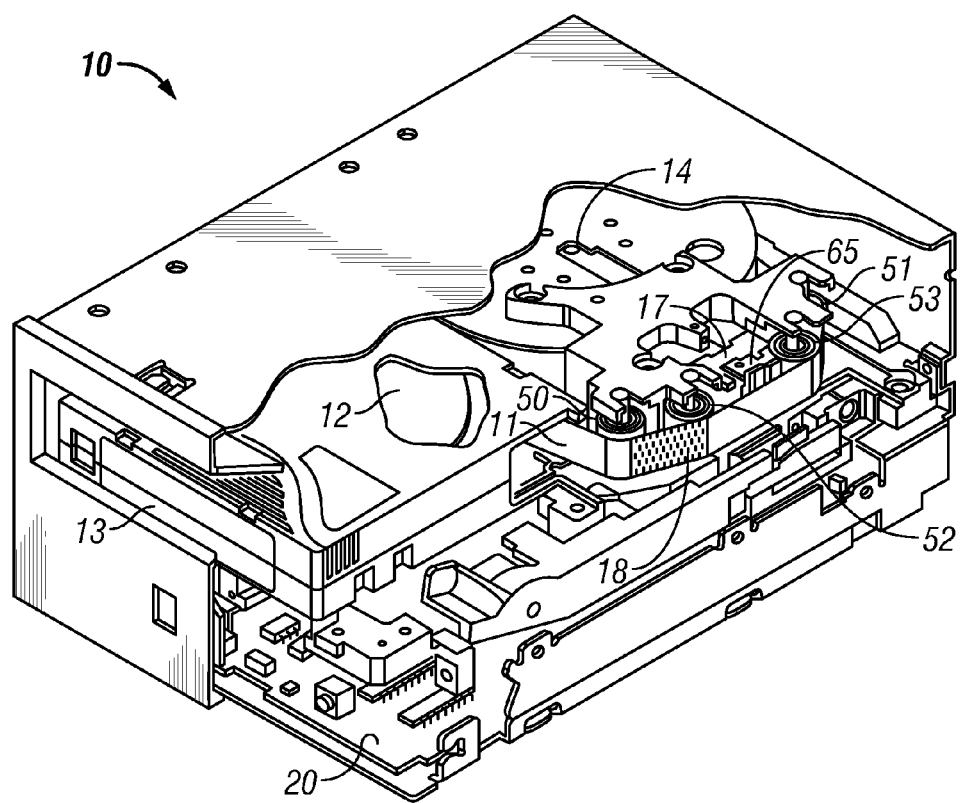
FIG. 1 is a partially cut away view of a magnetic tape data storage drive which implements the present invention.
Figure 2:
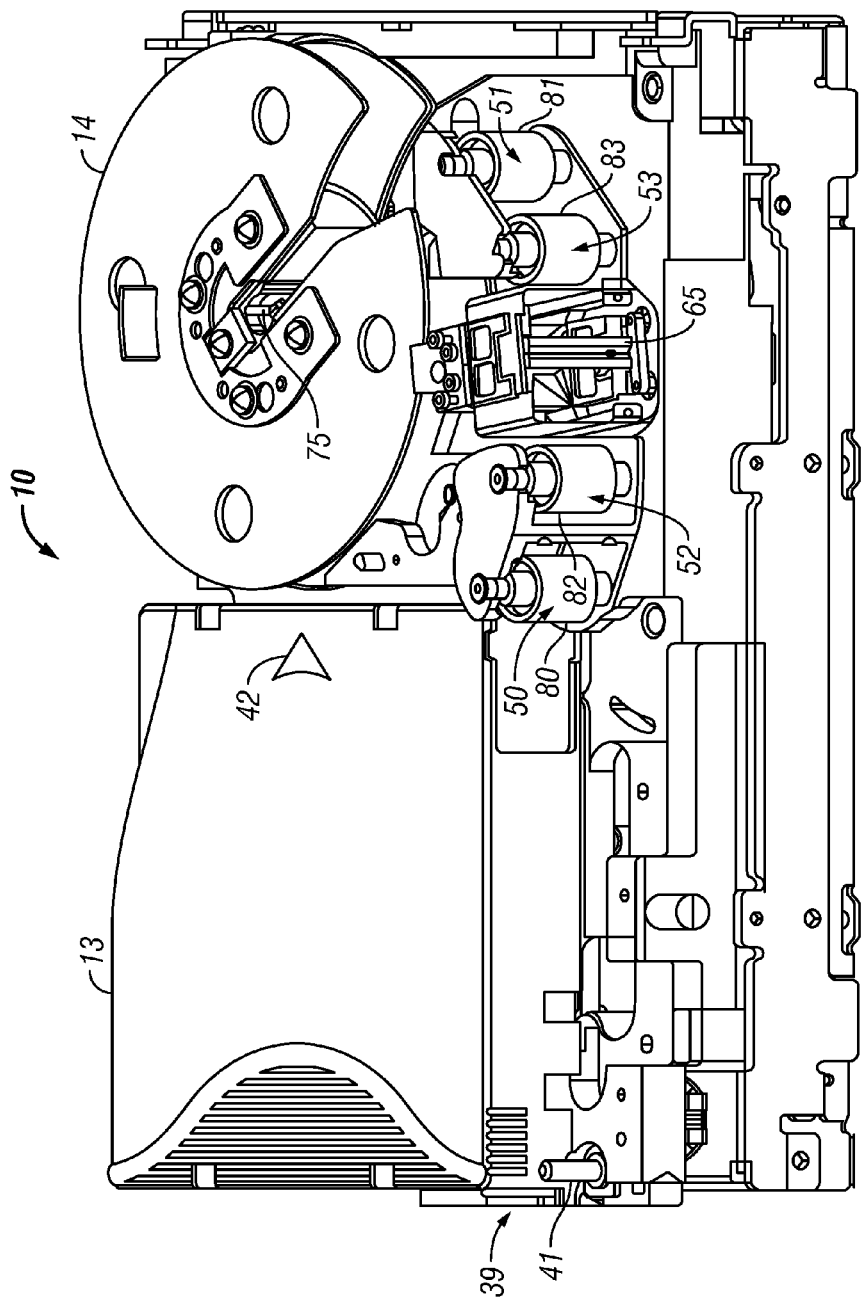
FIG. 2 is a view of the data storage drive of FIG. 1 with the cover removed.

FIGS. 1 and 2 illustrate a magnetic tape data storage drive 10 which writes data 18 to and reads data from longitudinal tape comprising magnetic tape data storage media 11. As is understood by those of skill in the art, magnetic tape data storage drives, also called magnetic tape drives or tape drives, may take any of various forms. The illustrated magnetic tape drive 10 moves the magnetic tape 11 along a tape path in the longitudinal direction of the tape from a supply reel 12 in a magnetic tape data storage cartridge 13 to a take up reel 14. An example of a magnetic tape drive is the IBM® LTO (Linear Tape Open) magnetic tape drive. Another example of a magnetic tape drive is the IBM® TotalStorage Enterprise magnetic tape drive. Both the above examples of magnetic tape drives employ single reel tape cartridges 13. An alternative magnetic tape drive and magnetic tape cartridge is a dual reel cartridge and drive in which both reels 12 and 14 are contained in the cartridge.

The magnetic tape media 11 is moved in the longitudinal direction across a tape head 65. The tape head may be supported and laterally moved by a compound actuator 17 of a track following servo system. The magnetic tape media is supported by roller tape guides 50, 51, 52, 53, which are flangeless, while the magnetic tape media is moved longitudinally.

A typical magnetic tape data storage drive operates in both the forward and reverse directions to read and write data. Thus, the magnetic tape head 65 may comprise one set of read and write elements for operating in the forward direction and another set for operating in the reverse direction, or alternatively, may have two sets of the read elements on either side of the write elements to allow the same write elements to write in both directions while the two sets of read elements allow a read-after-write in both directions.

The magnetic tape data storage drive 10 comprises one or more controls 20 for operating the magnetic tape data storage drive in accordance with commands received from an external system. The external system may comprise a network, a host system, a data storage library or automation system, a data storage subsystem, etc., as is known to those of skill in the art. A control typically comprises logic and/or one or more microprocessors with a memory 19 for storing information and program information for operating the microprocessor(s) and drive. The program information may be supplied to the memory via the interface 21, by an input to the control 20 such as a floppy or optical disk, or by reading from a magnetic tape cartridge, or by any other suitable means. The magnetic tape data storage drive 10 may comprise a standalone unit or comprise a part of a tape library or other subsystem, which may comprise the external system. The control 20 also provides the data flow and formatter for data to be read from and written to the magnetic tape media, as is known to those of skill in the art.

A cartridge receiver 39 is configured to receive a magnetic tape cartridge 13 oriented in a single direction, and to align the magnetic tape cartridge, for example, with guide pin 41, with respect to the cartridge receiver. The proper orientation may be illustrated on the cartridge itself, for example, by arrow 42 on the cartridge. The proper orientation may be enforced by the specific shape of the cartridge or by means of various notches that interact with the receiver, as is known to those of skill in the art. The orientation of the magnetic tape cartridge is such that the magnetic tape 11 exits the cartridge at a specified point of the cartridge receiver. A tape threading mechanism may move the free end of the magnetic tape 11 from the magnetic tape cartridge 13 to a take up reel 14, for example, positioning the free end leader block at the central axis 75 of the take up reel. The magnetic tape is thus positioned along the tape path.

In the illustrated embodiment, flangeless tape guide rollers 50, 51, 52 and 53 each has a cylindrical surface 80, 81, 82, 83 oriented to provide a tape path for the magnetic tape 11 across the magnetic tape head 65.

The tape path comprises at least one flangeless tape guide roller 50 positioned between the magnetic tape cartridge 13 and magnetic tape head 65, and may comprise at least one flangeless tape guide roller 50, 51 at either side of the magnetic tape head 65. Additional tape guide rollers or other types of guides may be provided depending on the length and/or complexity of the tape path, and preferably comprise flangeless tape guide rollers, such as tape guide rollers 52 and 53.

Figure 3:
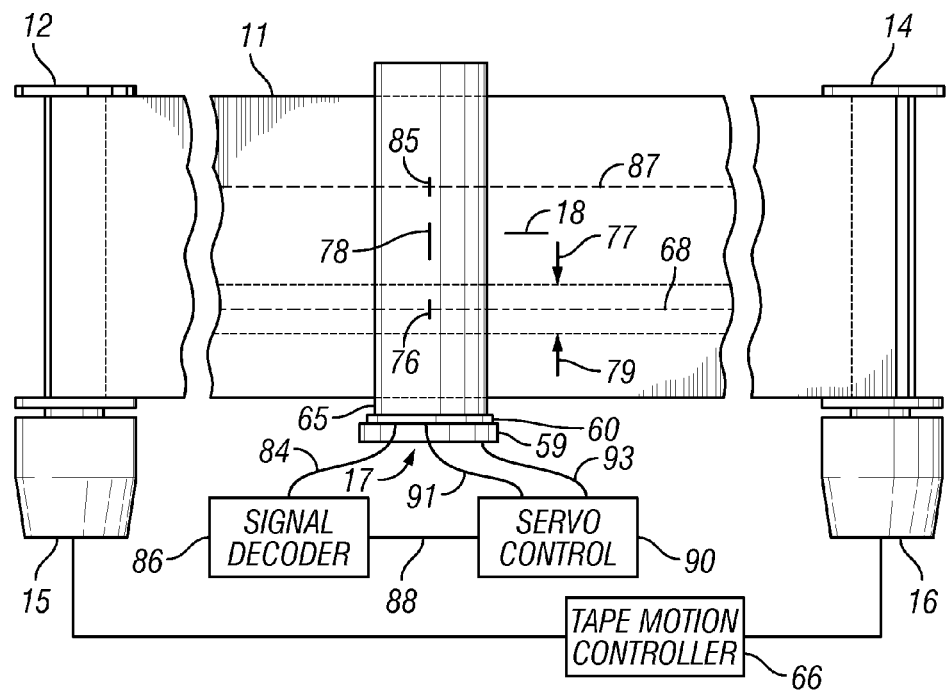
FIG. 3 is a diagrammatic view of the longitudinal tape, tape head and servo system of FIG. 1.

Referring to FIG. 3, as is known to those of skill in the art, flangeless tape guides, such as rollers 50, 51, 52 and 53 of FIG. 2, tend to solve the problems of flanged tape guides, but, as the longitudinal tape 11 is moved longitudinally across the magnetic tape head 65, without being constrained, the tape tends to rapidly shift from one side of the tape head to the other, and to run at one side of the tape head for only a short period.

Still referring to FIG. 3, the longitudinal tape 11 is moved across the tape head 65 between reels 12 and 14 (the tape guide rollers are not shown) by reel motors 15 and 16 under the control of a tape motion controller 66 of control 20 of FIG. 1. The reel motors are operated at various speeds as controlled by the tape motion controller to insure that the magnetic tape media leaves one reel at the same speed that it is wound onto the other reel. The tape motion controller also controls the torque applied to each drive motor 15 and 16 to control the tension applied to the magnetic tape media at the tape head 65.

The magnetic tape head 65 comprises at least one servo read head or sensor 76 that senses a servo pattern recorded in a servo track 68 of the tape 11. A plurality of servo read sensors, such as sensor 85 may be at various positions of the magnetic head 65, and a number of parallel servo tracks, such as servo track 87 may be at various positions across the tape 11. As is understood by those of skill in the art, the servo tracks typically extend in the longitudinal direction the full length of the tape, and are prerecorded and defined as a part of the manufacturing process of the tape cartridge 13. A data head 78, which may comprise several data read/write elements, is shown positioned over a data track region 18 of the tape, for example, containing a plurality of parallel data tracks. As is understood by those of skill in the art, typically, the defined servo tracks of magnetic tape systems are parallel to and offset from the data tracks. The servo track 68 is illustrated as a single line, for example a centerline of a servo track that is wide enough to allow a single servo track or set of tracks to allow servoing of various sets of data tracks by offsetting the servo element from the centerline.

As the tape 11 is moved longitudinally along the tape path, the servo read head 76 reads the servo signals which are provided on a servo signal line 84 to a servo decoder 86. The servo decoder processes the received servo signals and generates a position signal that is provided on a position signal line 88 to a servo control 90. The servo control 90 responds to seek signals to cause the compound actuator 17 to move between servo tracks, and responds to the position signals to cause the actuator 17 to follow the desired servo track.

Figure 4:
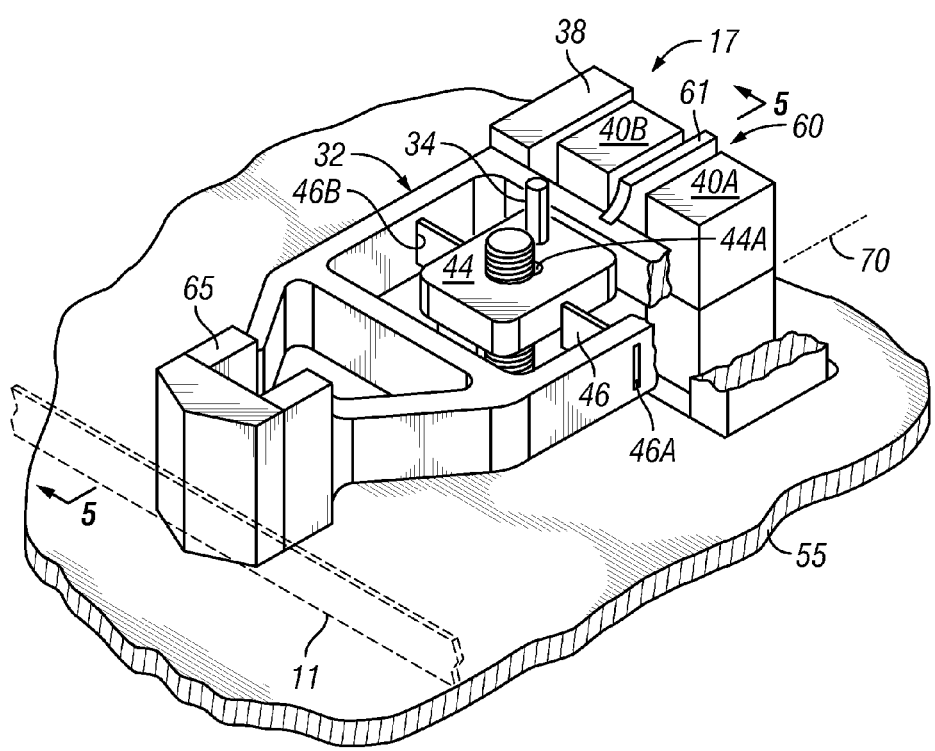
FIG. 4 is a view of a magnetic tape head and compound actuator of the data storage drive of FIG. 1.
Figure 5:
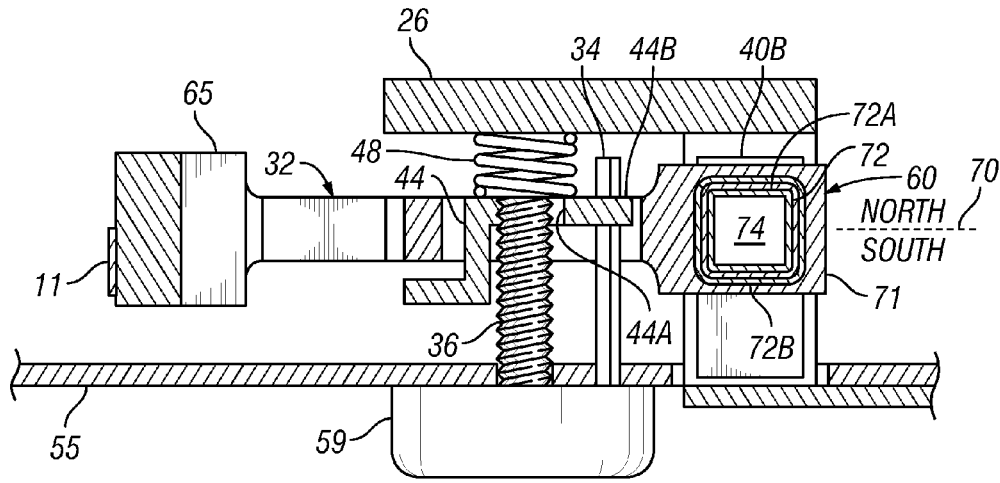
FIG. 5 is a partially cut away side view of the magnetic tape head and compound actuator of FIG. 4.

Referring to FIGS. 3, 4 and 5, an embodiment of the compound actuator 17 is illustrated. The actuator 17 comprises an actuator arm 32 mounting the magnetic tape head 65. A coarse actuator motor 59 drives a lead screw 36 to move fine actuator stage 44 at an aperture 44A in a vertical direction perpendicular to a base 55. An aperture 44B is provided to receive an anti-rotation pin 34, and a load spring 48 is provided between a housing 26 and the stage 44. A torsion spring 46 is fixed to the stage 44 and is coupled at its ends 46A and 46B to the actuator arm 32 so that the stage 44 moves the head 65 mounted on the actuator arm 32 in a vertical direction across the tape.

A fine actuator coil assembly 60 is attached to an end of the actuator arm 32. The coil assembly 60 comprises a coil frame 71, a coil 72, and a mandrel 74. The coil 62 has an upper portion 72A and a lower portion 72B, and is disposed between magnets 40A and 40B held in a magnet housing 38 which are arranged to split the north and south poles at approximately the line 70. The coil moves vertically upon application of a current at the coil 72 and causes the actuator arm 32 to pivot about torsion spring 46 and move the tape head 65 transversely of the tape 11 to make adjustments such as in track following mode.

The servo control 90 responds to the position signals to generate servo control signals on line 91 to operate the fine actuator 60 to follow the desired servo track, and when the fine actuator movement is insufficient to accommodate the full move, or a large move is required for other purposes, the servo control 90 generates servo control signals on line 93 to cause the coarse actuator 59 to move the fine actuator is the desired direction.

Alternative compound actuators are known to those of skill in the art, all having both a fine actuator providing high bandwidth, but with a limited range of travel, and a coarse actuator providing a large working dynamic range.

Figure 6:
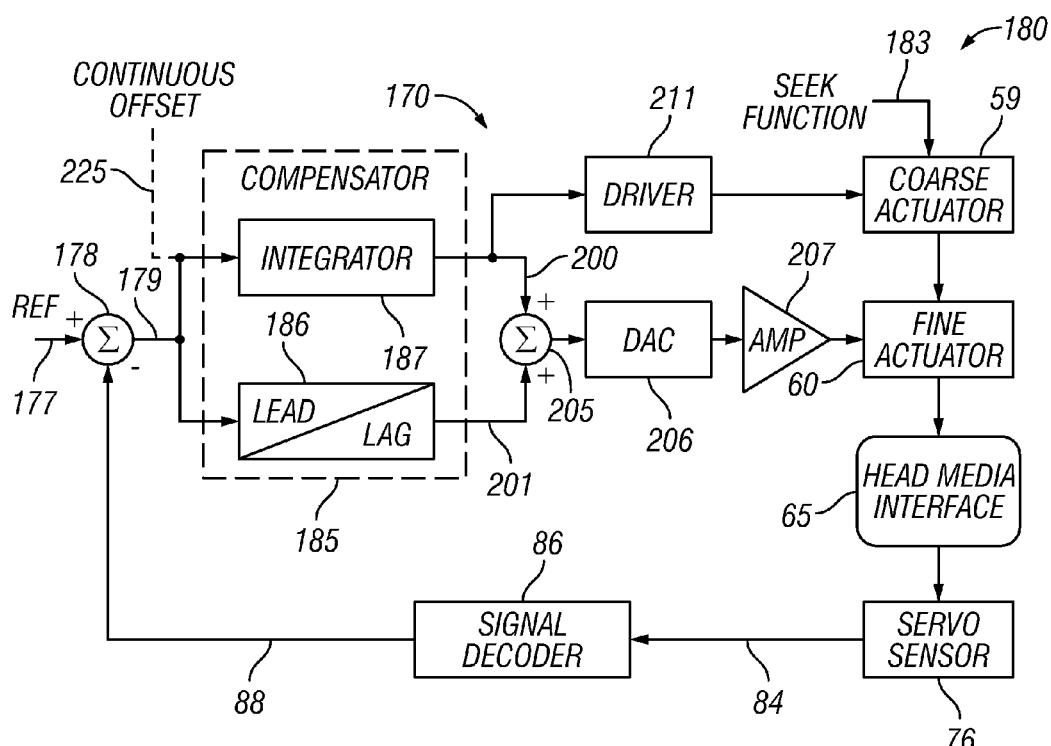
FIG. 6 is a block diagram of an embodiment of the servo system of FIG. 3.

An embodiment of a servo control 90 is illustrated in FIG. 6 as part of a position error signal loop 170 of a servo system 180. The operation of the servo system is discussed in detail in the incorporated '303 patent. Briefly, the servo signals are sensed by servo element 76 of head 65, and the position of the servo element relative to a servo track is detected from the servo signals by the signal decoder 86. The detected position signals are provided on line 88 and preferably comprise digital signals. The position signals are then compared to a reference signal 177 by a comparator 178 to determine position error between the read and a desired position related to the defined servo tracks, called the position error signal, or "PES", on line 179.

The fine actuator servo typically has a compensator function 185 in the position error signal loop, which is designed to enable maximum bandwidth with adequate stability margins. The compensator function 185 modifies the PES signal by applying a variable gain to the PES signal, which gain is based upon the frequency of the input PES signal 179, or, from another viewpoint, upon the rates of change of the input PES signal.

The compensator function 185 includes an integrator 187 and other transfer function elements, such as a lead/lag functional element 186, to achieve the desired static and dynamic system performance and overall stability. Each element may be implemented as a filter, either an analog filter employing discrete components, or a digital filter, such as an IIR (infinite impulse response) or as a FIR (finite impulse response), or as microcode causing a microprocessor to perform the function.

The integrator 187 provides a response 200 that generally reduces the gain as the frequency increases. The lead/lag element 186 provides a response 201 which is enhanced at high frequencies and reduced at low frequencies. The combined response 205 provides a servo signal to the fine actuator 60 that has both high bandwidth and stability, as is understood by those of skill in the art. A digital to analog converter 206 and power amplifier 207 apply the signal to the fine actuator 60.

The integrator 187 integrates the present signal, approximating the current and therefore the force applied to the fine actuator, with prior signals to determine the DC component of the fine actuator PES. An alternative integration function comprises determining the DC component of the drive current for the fine actuator. The integration function output signal on connection 200 provides an integration control signal to a driver 211, which drives the coarse actuator 59, operating the coarse actuator to translate the fine actuator. If the coarse actuator is a stepper motor, the driver 211 is preferably digital up-down logic and a stepper driver. Thus, if the absolute maximum value of the integration function output signal is larger than the absolute minimum value, the driver 211 operates the stepper motor to step in a direction to center the maximum and minimum values of the integration output signal. A step of the stepper motor may result in a linear translation of the fine actuator, for example, of 3 microns. Alternatively, if the coarse actuator is analog, the driver 211 may convert the digital signal to analog and employ a power amplifier to operate the coarse actuator 59.

The coarse actuator may also be operated by a seek function 183 which moves the fine actuator from one servo track to another.

Figure 7:
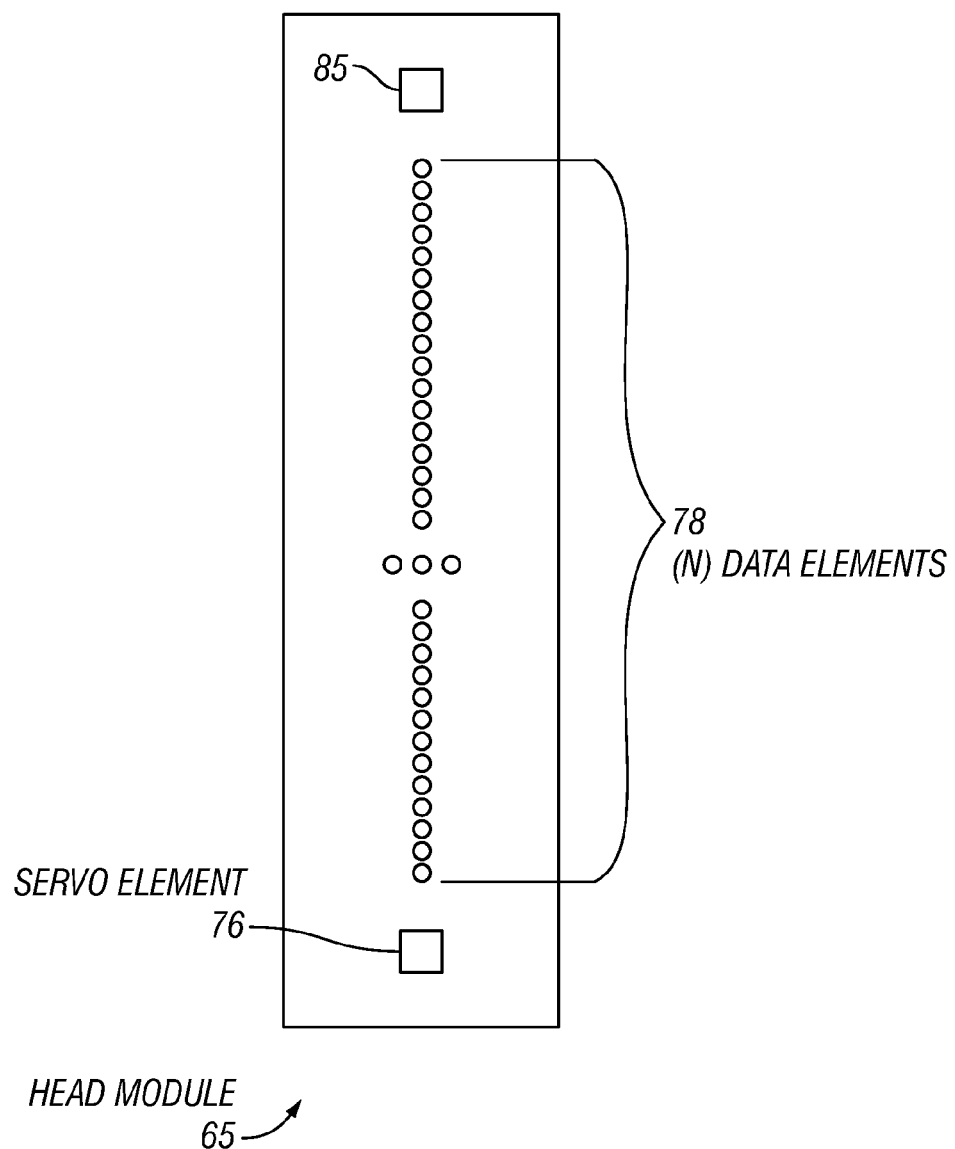
FIG. 7 is a diagrammatic view of the magnetic tape head of FIG. 4.

Referring to FIG. 7, the exemplary head module 65 comprises two servo elements 76 and 85 separated by the distance between servo tracks of the tape, and comprises a number (n) of data elements 78 arranged to trace parallel paths and read and write data with respect to data tracks of the tape. As discussed in the incorporated '435 Application, one or more of the data elements and the associated circuitry may be configured to read a servo track of the tape. Thus, in an instance when the head module 65 is positioned so that the servo elements 76 and 85 are not positioned over servo tracks, a data element may be able to identify that it is positioned at a servo track.

Referring to FIGS. 3 and 7, as the longitudinal tape 11 is moved longitudinally across the magnetic tape head 65, the tape tends to rapidly shift from one side of the tape head to the other, and to run at one side of the tape head for only a short period. The shifting of the tape 11 results in shifting the servo track 68 in the lateral direction, illustrated in FIG. 3 as shifting between lateral shift extreme 77 and lateral shift extreme 79, comprising lateral shift excursions between the extremes. The fine actuator is designed to handle the rapid shifts of the longitudinal tape once the servo track has been acquired, and, as such, is capable of rapidly jumping in the direction needed to follow the acquired servo track.

With the shifting behavior of the tape, the servo system must first find and acquire the servo track in order to follow the servo track.

The servo system may first move the head module to a position where the servo track is likely to be encountered, such as a midpoint of the expected excursion of the tape. In one example, the fine actuator is centered on the coarse actuator and the coarse actuator moves the fine actuator and head module to the position where the servo track is likely to be encountered.

In one example, a new tape cartridge may initially run at one side of the tape head for an extended time because of the way that the tape is wound on the tape reel during manufacture. Which side, however, is unknown. In another example, the tape shifts and is at one side of the tape head a short time.

Figure 8A:
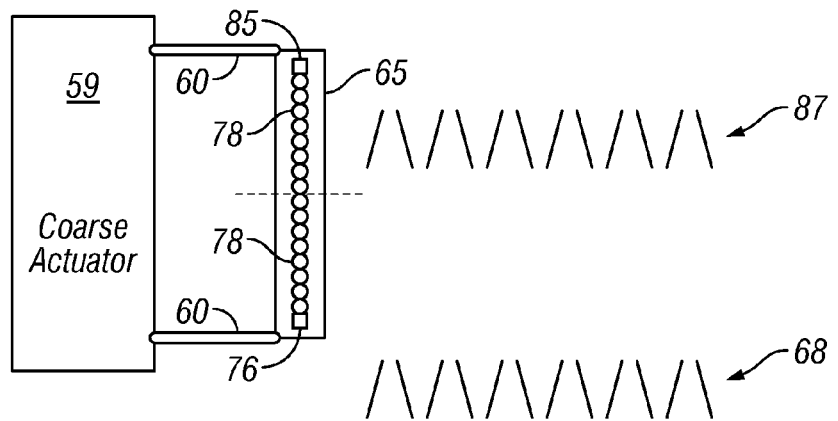
FIGS. 8A, 8B and 8C are diagrammatic views of the magnetic tape head, compound actuator and servo tracks of FIG. 1.
Figure 8B:
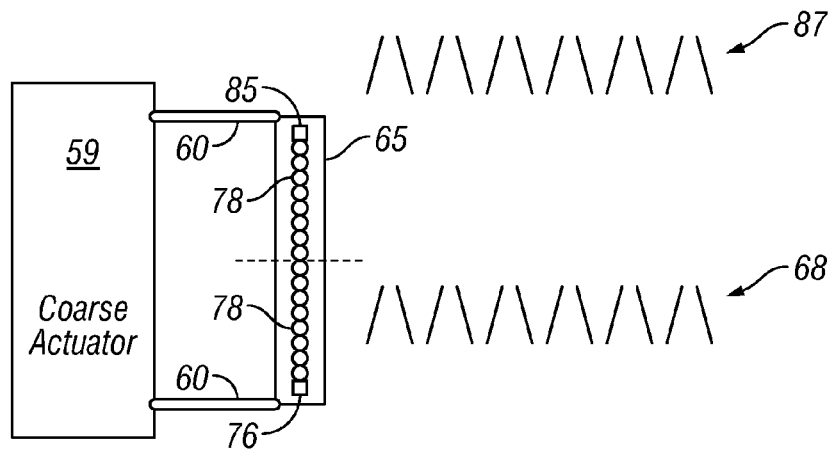
Figure 8C:
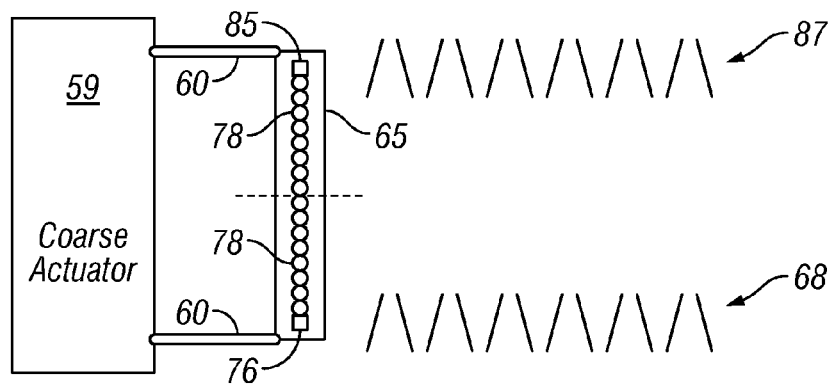
Figure 9:
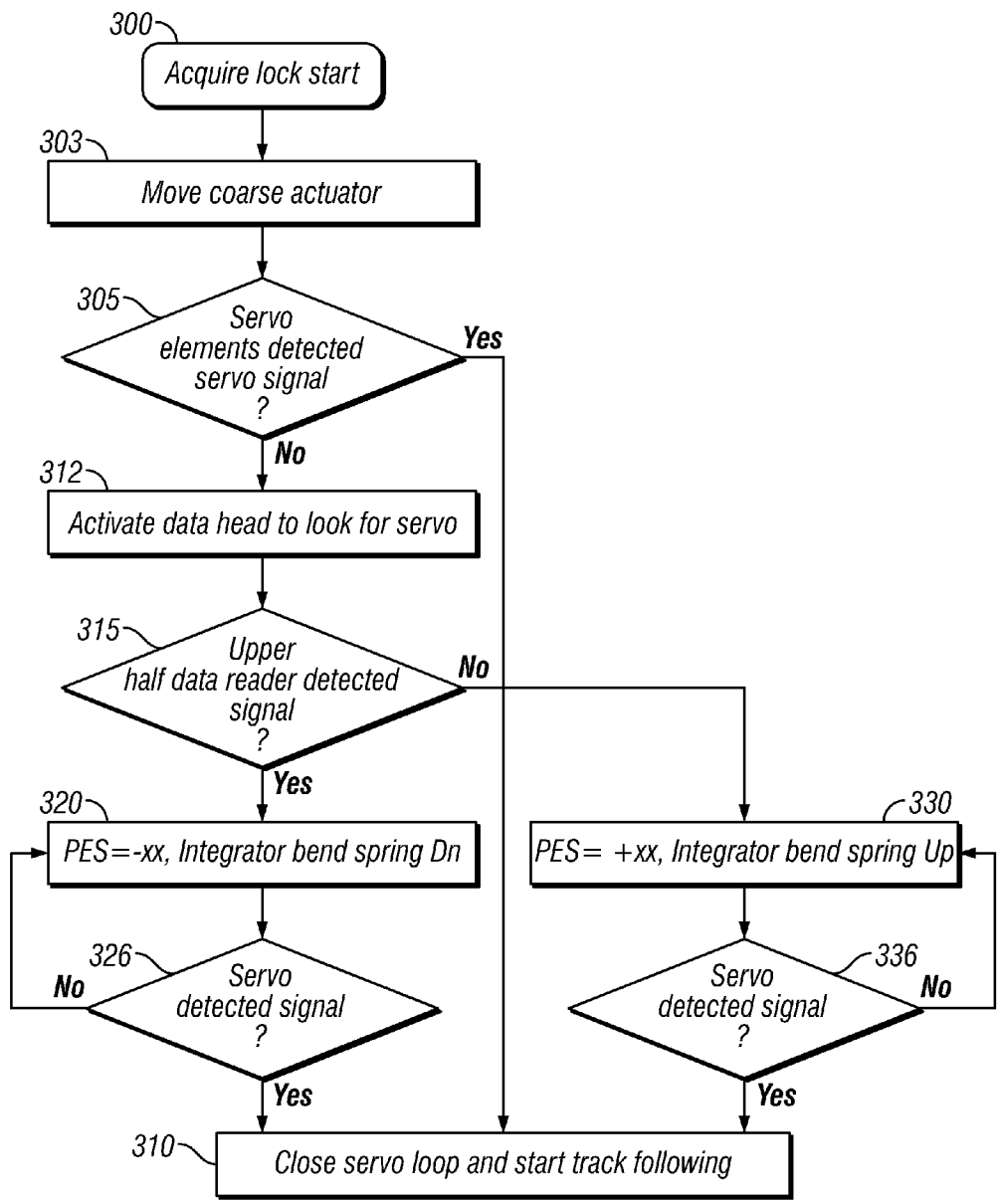
FIG. 9 is a flow chart depicting exemplary methods of operating the data storage drive of FIGS. 1 and 2.

FIGS. 8A, 8B and 8C represent the three possibilities. In FIG. 8A, the head module 65 is initially positioned so that the servo elements 76, 85 are positioned above the servo tracks 68, 87 and cannot sense and acquire the servo tracks. In FIG. 8B, the head module 65 is initially positioned so that the servo elements 76, 85 are positioned below the servo tracks 68, 87 and cannot sense and acquire the servo tracks. In FIG. 8C, the head module 65 is initially positioned so that the servo elements 76, 85 are positioned at the servo tracks 68, 87 and can sense and acquire the servo tracks.

In one embodiment, in the first two cases, the initial estimated location of the head module with respect to the tape is estimated from the location of the servo channel signal, for example, as detected by one or more of the data elements 78 as discussed in the incorporated '435 Application. Although only two servo tracks 68, 87 are illustrated, in the LTO embodiment discussed above, five servo tracks are provided, separating four data bands. Once the initial estimated location is known, the present invention moves the head module towards the servo tracks. In another embodiment, the direction that the head module is moved is selected randomly.

Referring to FIGS. 6, 8A, 8B, 8C and 9, the acquisition of the servo track begins at step 300. In step 303, the coarse actuator 59 is moved to an initial position, for example, by application of a seek function at line 183. As one example, the initial position may comprise the expected location of the center of the lateral tape movement, and at the expected location of the center of the tape. The fine actuator has the reference value 177 set at "0" so that the fine actuator is centered on the coarse actuator and may move equally in either the up or down direction.

Step 305 determines whether, at the initial positions of the coarse and fine actuators, the servo elements 76, 85 detect the servo tracks, e.g. servo tracks 68, 87. If so, the head module 65 is properly positioned and step 310 closes the servo loop to acquire the servo track and begins track following. This is case 3 as shown in FIG. 8C.

If step 305 instead indicates that no servo signal is detected by the servo elements 76, 85, the servo elements are either above the servo tracks of case 1 of FIG. 8A, or below the servo tracks of case 2 of FIG. 8B.

In one embodiment, step 312 activates the data elements 78 to look for the servo signals. In the present invention, the determination is to decide which direction to operate the fine actuator 60 to find the servo tracks. This determination is made in step 315 which determines whether a servo track is detected by a data element in the upper half of the data elements or in the lower half.

If step 315 determines that the servo signal was detected by a data element in the upper half of the data elements 78, "Yes", step 320 applies a negative continuous position error offset signal at input 225 to the fine actuator. This is case 1 represented in FIG. 8A. The negative signal is such that the fine actuator 60 will move in a direction towards the defined servo track or tracks 68, 87.

The continuous position error offset signal 225 is a predetermined signal of a rate less than the maximum position error signal for the fine actuator, in one embodiment less than five percent of the maximum position error signal for the fine actuator. In a specific example, the continuous position error offset signal is approximately one percent of the maximum position error signal. For example, the maximum range of the fine actuator in one direction is 500 µm, and the continuous position error offset signal is the amplitude to adjust the fine actuator 5 µm.

The continuous position error offset signal is applied to integrator 187 which integrates the continuous position error offset signal to operate the fine actuator 60 to continuously translate the head 65 laterally towards the defined servo track 68, 87.

Step 326 keeps checking the servo elements 76, 85 to determine if one or more of the servo elements detects a servo signal. If not, the position error offset signal continues to be applied and is integrated to translate the head 65 further towards defined servo track 68, 87. Detection of a servo track by a servo element leads to step 310 to acquire the servo track, close the servo loop and start tracking, and, in response to the servo system acquiring the defined servo track, the continuous position error offset signal 225 is discontinued.

If step 315 indicates that the servo signal was detected by a data element in the lower half of the data elements 78, "No", step 330 applies a positive continuous position error offset signal at input 225 to the fine actuator. This is case 2 represented as FIG. 8B. The positive signal is such that the fine actuator 60 will move in a direction towards the defined servo track or tracks 68, 87.

The continuous position error offset signal 225 is the same predetermined signal of a rate less than the maximum position error signal for the fine actuator, but of the opposite polarity. Again, in one embodiment, the continuous position error offset signal is less than five percent of the maximum position error signal for the fine actuator, and in one example, the continuous position error offset signal is approximately one percent of the maximum position error signal.

The continuous position error offset signal is applied to integrator 187 which integrates the continuous position error offset signal to operate the fine actuator 60 to continuously translate the head 65 laterally towards the defined servo track 68, 87.

Step 336 keeps checking the servo elements 76, 85 to determine if one or more of the servo elements detects a servo signal. If not, the position error offset signal continues to be applied and is integrated to translate the head 65 further towards defined servo track 68, 87. Detection of a servo track by a servo element leads to step 310 to acquire the servo track, close the servo loop and start tracking, and, in response to the servo system acquiring the defined servo track, the continuous position error offset signal 225 is discontinued.

By applying the continuous position error offset signal, and integrating the signal, the effective rate of change translates the head 65 at a rate less than the very high maximum rate so that the servo track acquisition may be made without the risk of missing the acquisition by moving too rapidly across the servo track, or if acquisition is made, without the risk of decelerating the fine actuator to zero rapidly and with a ringing response.

When the servo track is acquired, the track following servo can be locked to the signal and the position error signal can be updated with a real reference 177 instead of a constant 225. The coarse actuator may then be positioned as discussed in the incorporated '403 Application.

The implementations may involve software, firmware, micro-code, hardware and/or any combination thereof. The implementation may take the form of code or logic implemented in a medium in control 20, such as memory, storage and/or circuitry where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a servo system for positioning a head laterally to follow lateral motion of a longitudinal tape having at least one longitudinal defined servo track, said servo system comprising a servo element configured to sense lateral position of said head with respect to defined servo tracks, a fine actuator configured to translate said head laterally with respect to said longitudinal tape, a coarse actuator configured to translate said fine actuator laterally with respect to said longitudinal tape, and a position error signal loop configured to sense said servo element to detect servo signals and acquire at least one said defined servo track, to determine position error between said head and a desired position related to an acquired said at least one defined servo track, and to operate said fine actuator to translate said head laterally in a manner to reduce said determined position error, a method comprising:
    if said servo element is positioned away from said at least one defined servo track, applying a continuous position error offset signal to said fine actuator in a direction towards said at least one defined servo track, whereby said fine actuator translates said head in accordance with said continuous position error offset signal; and
    in response to said servo system acquiring said at least one defined servo track, discontinuing said continuous position error offset signal;
    wherein said applying step comprises integrating said continuous position error offset signal to operate said fine actuator to continuously translate said head laterally towards said at least one defined servo track.

2. The method of claim 1, wherein said continuous position error offset signal is a predetermined signal of a rate less than the maximum position error signal for said fine actuator.

3. The method of claim 2, wherein said predetermined continuous position error offset signal is less than five percent of said maximum position error signal for said fine actuator.

4. The method of claim 1, wherein said direction of said applying step is determined in response to detection of said at least one defined servo track with a data element.

5. A servo system configured to position a head laterally with respect to at least one defined servo track of longitudinal tape, comprising:
    a servo element for sensing lateral position of said head with respect to at least one defined servo track of said longitudinal tape;
    a fine actuator configured to translate said head laterally with respect to said longitudinal tape;
    a coarse actuator configured to translate said fine actuator laterally with respect to said longitudinal tape; and
    a servo control configured to sense said servo element; to detect servo signals and acquire at least one said defined servo track; to, if said servo element is positioned away from said at least one defined servo track, apply a continuous position error offset signal to said fine actuator in a direction towards said at least one defined servo track, operating said fine actuator to translate said head in accordance with said continuous position error offset signal; and in response to said servo element acquiring said at least one defined servo track, to discontinue said continuous position error offset signal; to determine position error between said head and a desired position related to said acquired at least one defined servo track; and to provide signals to operate said fine actuator to translate said head laterally in a manner to reduce said determined position error; wherein said servo control is configured to integrate said continuous position error offset signal to operate said fine actuator to continuously translate said head laterally towards said at least one defined servo track.

6. The servo system of claim 5, wherein said continuous position error offset signal is a predetermined signal of a rate less than the maximum position error signal for said fine actuator 7. The servo system of claim 6, wherein said predetermined continuous position error offset signal is less than five percent of said maximum position error signal for said fine actuator.

8. The servo system of claim 5, wherein said servo control is configured to determine the direction of said continuous position error offset signal in response to detection of said at least one defined servo track with a data element.

9. A servo control configured to operate a tape servo to position a head laterally with respect to at least one defined servo track of longitudinal tape, said tape servo comprising a servo element for sensing lateral position of said head with respect to at least one defined servo track of said longitudinal tape; a fine actuator configured to translate said head laterally with respect to said longitudinal tape; and a coarse actuator configured to translate said fine actuator laterally with respect to said longitudinal tape; said servo control configured:
    to sense said servo element to detect servo signals and acquire at least one said defined servo track;
    to, if said servo element is positioned away from said at least one defined servo track, apply a continuous position error offset signal to said fine actuator in a direction towards said at least one defined servo track, operating said fine actuator to translate said head in accordance with said continuous position error offset signal;
    in response to said servo element acquiring said at least one defined servo track, to discontinue said continuous position error offset signal;
    to determine position error between said head and a desired position related to said acquired at least one defined servo track; and
    to provide signals to operate said fine actuator to translate said head laterally in a manner to reduce said determined position error;
    said servo control configured to integrate said continuous position error offset signal to operate said fine actuator to continuously translate said head laterally towards said at least one defined servo track.

10. The servo control of claim 9, wherein said continuous position error offset signal is a predetermined signal of a rate less than the maximum position error signal for said fine actuator.

11. The servo control of claim 10, wherein said predetermined continuous position error offset signal is less than five percent of said maximum position error signal for said fine actuator.

12. The servo control of claim 9, configured to determine the direction of said continuous position error offset signal in response to detection of said at least one defined servo track with a data element.

13. A data storage drive comprising:
- a head configured to record and read data on a longitudinal tape data storage medium;
- a drive configured to move said longitudinal tape data storage medium in the longitudinal direction with respect to said head, said drive comprising at least one flangeless tape guide at either side of said head in said longitudinal direction and configured to position said longitudinal tape data storage medium in proximity with respect to said head; and
- a servo system configured to position a head laterally with respect to at least one defined servo track of longitudinal tape, comprising:
    - a servo element for sensing lateral position of said head with respect to at least one defined servo track of said longitudinal tape;
    - a fine actuator configured to translate said head laterally with respect to said longitudinal tape;
    - a coarse actuator configured to translate said fine actuator laterally with respect to said longitudinal tape; and
    - a servo control configured to sense said servo element; to detect servo signals and acquire at least one said defined servo track; to, if said servo element is positioned away from said at least one defined servo track, apply a continuous position error offset signal to said fine actuator in a direction towards said at least one defined servo track, operating said fine actuator to translate said head in accordance with said continuous position error offset signal; and in response to said servo element acquiring said at least one defined servo track, to discontinue said continuous position error offset signal; to determine position error between said head and a desired position related to said acquired at least one defined servo track; and to provide signals to operate said fine actuator to translate said head laterally in a manner to reduce said determined position error; wherein said servo control is configured to integrate said continuous position error offset signal to operate said fine actuator to continuously translate said head laterally towards said at least one defined servo track.

14. The data storage drive of claim 13, wherein said continuous position error offset signal is a predetermined signal of a rate less than the maximum position error signal for said fine actuator.

15. The data storage drive of claim 14, wherein said predetermined continuous position error offset signal is less than five percent of said maximum position error signal for said fine actuator.

16. The data storage drive of claim 13, wherein said servo control is configured to determine the direction of said continuous position error offset signal in response to detection of said at least one defined servo track with a data element.

* * * * *